United States Patent [19]

Vine et al.

[11] 4,415,537

[45] Nov. 15, 1983

[54] CATALYTIC COMBUSTOR

[75] Inventors: Raymond W. Vine, Avon; John C. Trocciola, Glastonbury; Herbert J. Setzer, Ellington, all of Conn.

[73] Assignee: United Technologies Corporation, Hartford, Conn.

[21] Appl. No.: 344,896

[22] Filed: Feb. 1, 1982

[51] Int. Cl.³ .............................................. B01D 53/36
[52] U.S. Cl. .................................... 422/180; 110/203; 110/345; 126/58; 126/217; 422/177; 423/210; 431/7
[58] Field of Search ....................... 422/171, 177, 180; 55/74, 387; 60/299; 423/210, 213.2; 431/5, 7, 328; 126/58, 217, 285 R, 77, 299 F; 110/203, 210, 345

[56] References Cited

U.S. PATENT DOCUMENTS

| | | | |
|---|---|---|---|
| 2,658,742 | 11/1953 | Suter | 422/180 X |
| 2,720,494 | 10/1955 | Suter | 252/470 |
| 3,245,459 | 4/1966 | Keith | 158/99 |
| 3,806,322 | 4/1974 | Tabak | 422/180 X |
| 3,898,040 | 8/1975 | Tabak . | |
| 3,964,875 | 6/1976 | Chang et al. . | |
| 4,018,568 | 4/1977 | Brewer . | |
| 4,054,418 | 10/1977 | Miller et al. | 422/171 |
| 4,072,471 | 2/1978 | Morgan, Jr. et al. | 422/180 X |
| 4,080,150 | 3/1978 | Hunter et al. | 431/6 |
| 4,118,199 | 10/1978 | Volker et al. | 422/180 X |
| 4,127,691 | 11/1978 | Frost | 428/116 |
| 4,135,018 | 1/1979 | Bonin et al. | 428/116 |
| 4,195,063 | 3/1980 | Iwaoka et al. | 422/180 |
| 4,221,207 | 9/1980 | Syme | 126/77 |
| 4,246,234 | 1/1981 | Kittrell et al. | 422/171 |
| 4,330,503 | 5/1982 | Allaire et al. | 422/177 |
| 4,335,023 | 6/1982 | Dettling et al. | 422/180 X |

*Primary Examiner*—Richard L. Chiesa
*Attorney, Agent, or Firm*—Harry J. Gwinnell

[57] ABSTRACT

A catalytic combustor particularly adapted for use in wood and coal burning stoves is described comprising a high temperature stable support material containing a high activity, sulfur tolerant combustion catalyst. In addition to having a relatively long life, the catalytic combustors according to the present invention demonstrate useful performance even in the presence of sulfur containing fuels. Furthermore, the catalytic combustors of the present invention improve the efficiency of such stoves over and above that provided by conventional catalytic combustors.

4 Claims, 3 Drawing Figures

CATALYTIC COMBUSTOR

DESCRIPTION

1. Technical Field

The field of the art to which this invention pertains is combustion catalysts and particularly combustion catalysts for exhaust material such as smoke from wood burning stoves.

2. Background Art

In view of the ever increasing concern over the availability and cost of energy resources such as oil and natural gas, many people have turned to solid fuels such as wood and coal for heating their dwellings. Much of this solid fuel combustion technology as represented by wood and coal burning stoves is 40–50 years old or older. However, recently new stove designs aimed at improving efficiency and cleaner burning have been developed. Note, for example, U.S. Pat. No. 4,221,207.

The latest so-called "second generation" stoves have sought additional and substantial improvements in burning efficiency and reduced emissions of pollutants by including in the design such things as the insertion of a catalytic combustor in the upper or exhaust portion of the stoves to cause additional combustion of the exhaust or smoke exiting from the stove. In addition to decreasing the pollutants exhausting from the stove and lessening such things as creosote build-up in chimneys, such combustors have also improved the combustion efficiency of the stove, thus providing greater heat per amount of fuel combusted. However, there is still a need to improve the efficiency of such combustors due to such things as decreased life of the catalyst material from the fuels combusted.

Accordingly, even though greater strides have been made in this area to date, there is still a need for improving the efficiency of such combustion systems.

DISCLOSURE OF THE INVENTION

The present invention is directed to a catalytic combustor for combusting exhaust gases from various fuel supplies. The combustor is long-lasting, and sulfur tolerant. It is also much more efficient than conventionally used combustors of this type. The combustor comprises an exhaust-gas-stable lanthanum stabilized alumina or magnesium promoted lanthanum stabilized alumina catalyst support material carrying a rhodium combustion catalyst.

Another aspect of the invention includes a wood burning stove containing such catalytic combustor.

The foregoing, and other features and advantages of the present invention will become more apparent from the following description and accompanying drawing.

BEST MODE FOR CARRYING OUT THE INVENTION

Figure 1:
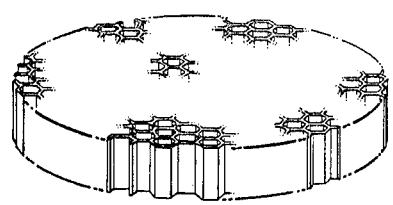
FIGS. 1 and 2 show a typical catalytic combustor configuration for use in accordance with the present invention.
Figure 2:
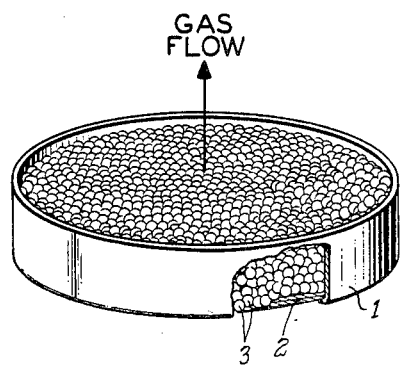

The catalyst material according to the present invention is supported on a combustion-gas-stable substrate. This substrate material may be any conventionally used configuration such as a honeycomb structure of cylindrical cross section (FIG. 1) or a canister (FIG. 2) having a metal screen support 1 and particulate material 2 impregnated with the improved catalytic material supported on such screen.

This support material is typically made of stable ceramic such as aluminum oxide, cordierite, silica, zirconia or stable metals such as stainless steel. Lanthanum stabilized alumina or magnesium promoted lanthanum stabilized alumina are especially preferred substrates for use in accordance with the present invention.

The lanthanum stabilized alumina substrate is a commercially available catalyst support material available from W. R. Grace & Co. (e.g. Grace SMR 1449). The magnesium promoted lanthanum stabilized alumina is prepared by impregnating the lanthanum stabilized alumina with a solution (preferably aqueous) of a magnesium salt (preferably magnesium nitrate) followed by drying to remove the solvent, and calcining in air to oxidize the deposited salt to magnesium oxide. Calcining temperatures may vary depending on the particular salt used, but generally temperatures in the range of about 1800° F. (982° C.) are used, e.g. for magnesium nitrate. Enough magnesium salt is deposited on the support material such that after calcining about 3% to about 15% magnesium is present in the support material, and preferably about 5% by weight.

The use of such substrate material is preferred because of its particular stability at elevated temperatures in a combustion environment. Such substrate material has been found to maintain a high B.E.T. (Bruinauer-Emmett-Teller) surface area, the substrate material maintains its dimensional stability (e.g. lack of shrinkage, especially in pellet form), and has an acceptable crush strength especially when magnesium promoted. This substrate material has also been found to allow formation of small metal crystallites on its surface which is necessary for catalytic performance according to the present invention. The material also has improved tolerance to carbon formation over, for example, unmodified alumina.

The active catalyst material according to the present invention is deposited on the substrate material by any conventional method in this art, and preferably out of aqueous solution. Metal salts and typically the nitrates are dissolved in either aqueous or organic solvents and dried on the substrate. The deposited salts are then treated with hydrogen to form metal crystallites. Rhodium metals have been found to be useful to obtain advantages according to the present invention. It should be noted that any acceptable route may be used to go from the salt to the metal such as going from the salt form directly to the metal crystallites by hydrogen reduction or oxidation of the salt in air followed by reduction in hydrogen so long as the metal crystallites are formed on the substrate material ultimately. Amounts of rhodium used may vary over a wide range, but are generally used in amounts based on catalyst plus support material of about 0.01% to about 6% rhodium and typically in amounts of about 0.1% to about 1% rhodium.

While the canisters, honeycomb inserts, etc. can be of any size required by the particular stove design in which it will be used, such cylinders are typically 0.5 to 2 feet$^2$ (15.24 to 60.96 cm)$^2$ with openings sufficiently large so as not to interfere with the natural draft of the exhaust gas channel, but sufficiently small to support the layers of pellets above. Stainless steel screens with substantially square openings of approximately 0.0625 inch (0.159 cm) diagonal measure are typically used. The depth of particles loaded onto the screen generally range from 0.375 inch to 2 inches (0.935 cm to 5.08 cm) depending on the exhaust channel in which they will be used. In a natural draft environment, a lower pressure drop is required and catalyst bed depth must be kept thin. In a forced draft environment in which a greater pressure drop can be tolerated, the depth of the catalyst layers can be greater.

Attention is also directed to commonly assigned, copending patent application entitled "Combustion Catalyst Bed" by D. McVay and H. Setzer, filed of even date herewith which describes particularly suitable catalyst bed configurations for "combustion catalysts" when the pellet form of the catalytic material is used. The disclosure of this application is incorporated by reference.

Although this invention has been described in terms of catalytic combustors for use with wood burning stoves, it is equally adaptable for use in any environment where it is desired to improve the efficiency of a combustion process such as oil or gas fuel stoves or furnaces. It is also useful for removing potentially noxious fumes from gas streams.

As stated above, it is preferred to use the substrate material in pellet form for preparation and cost reasons. If such materials are used in pellet form, the particles are typically 0.0625 to 0.625 inch (0.159 to 1.59 cm) in diameter, and preferably 0.125 in. to 0.25 in. (0.318 cm to 0.635 cm) in diameter. If other than spherical particles are used, they should have similar dimensions.

The pellets may either be made fully catalyst impregnated or "ring catalyzed". By ring catalyzed is meant that unlike the fully impregnated pellets, only the outer portion of the pellets nearest the surface is impregnated with catalytic material. Typically, 25% or less (i.e. penetration of 0.001 in. to 0.100 in., 0.0025 cm. to 0.254 cm.) of the outermost portion of the pellet is catalyzed. The innermost portion of the pellet remains uncatalyzed. The exact amount of catalyst required will be determined by the burning rates of the wood and coal in the stove. The combustion rate of the fuels determines the quantity of exhaust or flue gases generated which in turn sets the quantity of combustion catalyst required. Furthermore, in a wood or coal burning stove environment, the inlet temperature seen generally ranges from 400° F. to 900° F. (204° C. to 482° C.) and the exit temperature ranges from 1100° F. to 1600° F. (593° C. to 871° C.).

The catalyst impregnated substrate materials function to reduce the ignition temperatures of the hydrocarbon and carbon monoxide material in the exhaust gas stream to burn in the range of 400° F. to 600° F. (204° C. to 316° C.). The heat generated from this burning further raises the temperature of the catalyst and support material, which in turn, further increases its catalytic activity. Furthermore, the high temperatures produced crack the heavy materials in the smoke or exhaust stream and leads to further combustion. As the carbon-monoxide and heavy hydrocarbon material in the exhaust gas stream continue to burn as a result of contact with the first layer of fully catalyzed pellets, the temperature will rise to in the order of 1200° F. to 1400° F. (649° C. to 760° C.).

EXAMPLE

A lanthanum stabilized alumina catalyst support material was purchased from W. R. Grace & Co. in pellet form having dimensions of about 0.125 in. (0.318 cm) diameter and about 0.250 in. (0.638 cm) length. A batch of these pellets was immersed in an aqueous solution of Mg (NO$_3$)$_3$.6H$_2$O having a concentration of about 57% by weight. After immersion for approximately 5 minutes with ultrasonic vibration and 30 minutes without, the pellets were removed from the solution. The pellets were then oven dried in air for 3 hours at about 230° F. (110° C.) and calcined at 1800° F. (982° C.) for 16 hours and cooled. The magnesium promoted lanthanum stabilized alumina pellets were then immersed in an aqueous solution of Rh (NO$_3$)$_3$ having a concentration of about 11.1% by volume. After immersion for approximately 5 minutes under ultrasonic vibration and 30 minutes without vibration, the pellets were removed from the solution and dried in air for 3 hours at 230° F. (110° C.), followed by heating in a hydrogen atmosphere to form the metal crystallites on the substrate material. This procedure deposits a surface layer of catalyst about 0.050 in. (0.127 cm) on the particulate material. If full impregnation is desired, immersion time in the Rh (NO$_3$)$_3$ should be extended, e.g. doubled.

The hydrogen reduction step was performed as follows. The above-treated pellets were placed on a tray in an oven which was first flushed with nitrogen. The oven temperature was raised to approximately 600° F. (316° C.) and the atmosphere over the pellets changed according to the following schedule:

| % N$_2$ | % H$_2$ | Time in Hours |
|---|---|---|
| 100 | 0 | 0.25 |
| 95 | 5 | 0.25 |
| 90 | 10 | 0.25 |
| 75 | 25 | 0.50 |
| 0 | 100 | 2.00 |

After cooling to 200° F. (93° C.), the atmosphere over the pellets is changed to 100% N$_2$. The pellets were then cooled to room temperature and the atmosphere over the pellets adjusted as follows:

| % N$_2$ | % O$_2$ | Time in Hours |
|---|---|---|
| 95 | 5 | 0.5 |
| 90 | 10 | 0.5 |
| 80 | 20 | 0.5 |

To further demonstrate the improved performance of the combustion catalyst according to the present invention, the following testing was performed. Utilizing a microreactor 0.375 in. (0.953 cm) inner diameter containing 1 inch (2.54 cm) length or approximately 0.5 gram of catalyst material, reaction rate constants (synonymous with activity) were plotted as a function of test temperature. Testing was performed for 30 hours combusting a mixture of methane containing approximately 2250 parts per million (by weight) H$_2$S. The reaction rate constant (k) is defined by the pseudo first order rate equation:

$$k = (\text{space velocity}) \times \ln\left(\frac{1}{1 - \frac{\% \text{ conversion}}{100}}\right)$$

Figure 3:
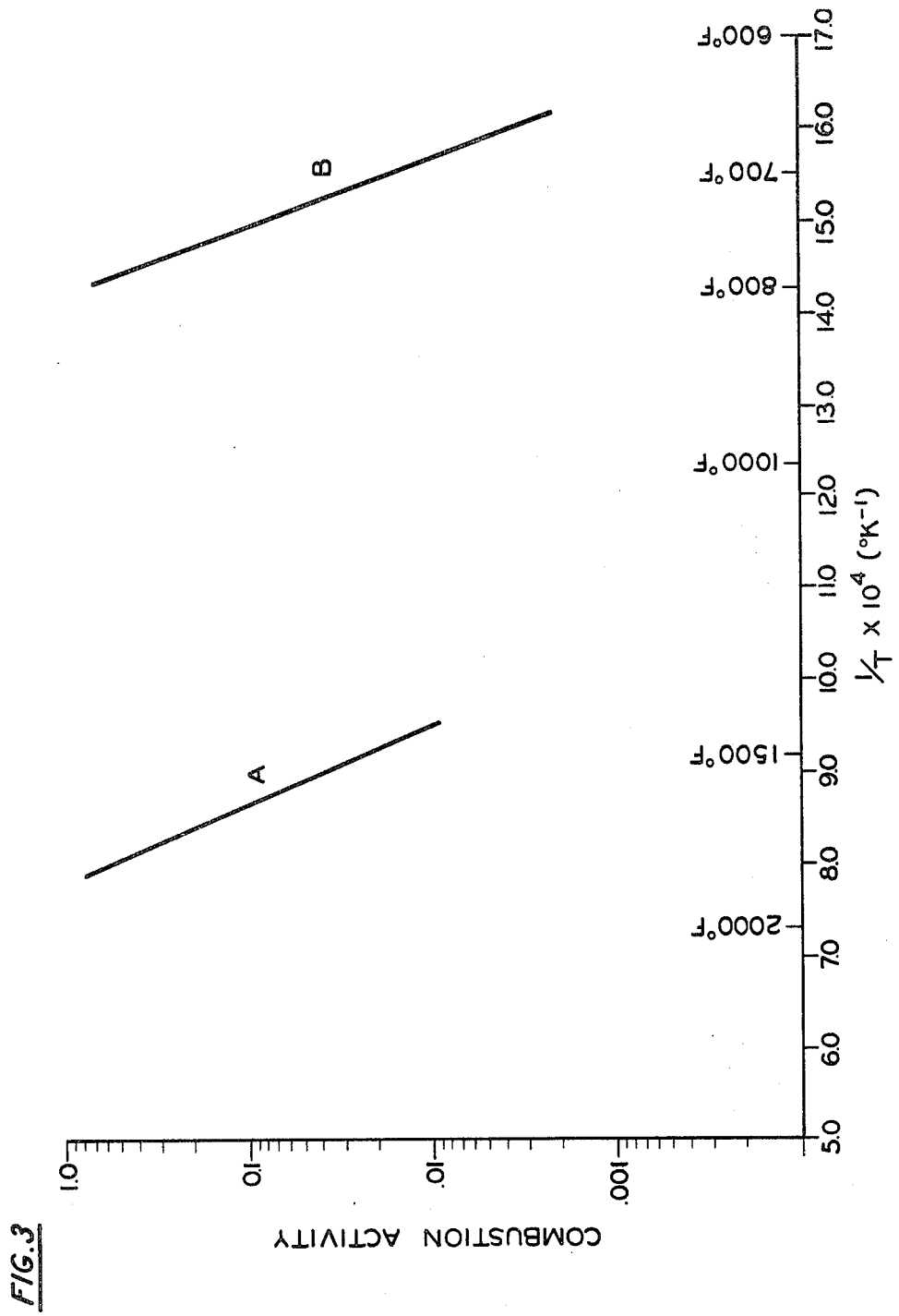
FIG. 3 shows a comparison of combustion activity of commercially available catalyst material and catalyst material according to the present invention.

In FIG. 3, data for commercially available catalysts (15% nickel by weight on alpha alumina—curve A) and a catalyst according to the Example (curve B) tested under these conditions are plotted on a conventional Arrhenius graph. As can be seen from the curves, the catalyst of curve B provides much greater activity at lower temperature. This demonstrates that even with potential sulfur poisoning (e.g. from a coal fuel source) the combustor according to the present invention still has a performance high enough to be useful in this environment.

To prepare a catalytic combustor according to the present invention, it is preferred to utilize a canister type container having a stainless steel support screen utilizing wire with a 0.032 in. (0.081 cm) diameter and 256 holes per inch$^2$ or 40 holes per cm$^2$ (i.e. 45% open). The walls of the canister are typically 300 series stainless steel such as 304 stainless steel. A multiplicity of layers of catalyst impregnated 0.25 inch (0.635 cm) diameter pellets are poured onto the support screen. The canister can then be covered with a temporary plastic cover to prevent excess movement during shipping. Note FIG. 2 where the canister is shown as 1 and support screen 2 and particle layers 3.

The thickness of the bed should be kept to a minimum to minimize the pressure drop across the bed, especially for a natural draft device such as a coal or wood burning stove. Industrial burners which utilize blowers for primary air can afford a deeper canister and the accompanying high pressure drop. If the pressure drop in either the natural draft or blower assisted environment is too great, i.e. the flow is restricted, the combustion rate of the wood or other solid fuel is adversely affected. However, there should be sufficient catalyst to provide a gas residence time which permits the catalyst to affect combustion of the gases on the catalyst. Since the draft on typical residential chimneys is in the order of 0.05 in. to 0.10 in. (0.127 cm to 0.254 cm) water as can be determined from the *Standard Handbook for Mechanical Engineers*, 7th Edition, McGraw Hill Book Co., the catalyst bed in the natural gas environment is sized in frontal area and bed depth to have a pressure drop in the order of 0.01 in. (0.0254 cm) water to minimize flow restriction. The pressure drop can be measured with a sensitive delta pressure gauge. Another way of detecting if the pressure drop is low enough and is not restricting is by determining if the fuel combustion rate, in pounds fuel burned per hour, is satisfactory. If the pressure drop is too low, i.e. the bed is too thin, bypassing and incomplete combustion of the smoke can occur. This can be detected by ovserving smoke in the stove's exhaust.

It should also be noted that while the invention has been described in terms of a rhodium catalyst, other catalysts such as ruthenium, nickel, palladium, iron oxide, iridium, platinum or conventional combustion catalysts are useful.

Although the invention has been shown and described with respect to detailed embodiments thereof, it will be understood by those skilled in the art that various changes in form and detail thereof may be made without departing from the spirit and scope of the claimed invention.

We claim:

1. A solid fuel burning stove comprising an air inlet section, a combustion section, a combusted and uncombusted gas exhaust section, and a catalytic combustor in the exhaust section, wherein the improvement comprises utilizing a sulfur tolerant catalytic combustor for wood or coal comprising a high temperature stable lanthanum stabilized alumina or magnesium promoted lanthanum stabilized alumina substrate impregnated with a sulfur tolerant, high activity rhodium combustion catalyst, said sulfur tolerant catalyst permitting interchangeable use of wood or coal as the solid fuel in the stove.

2. The solid fuel burning stove of claim 1 wherein the substrate is in the form of a cylindrical honeycomb.

3. The solid fuel burning stove of claim 1 wherein the substrate is in the form of pellets.

4. The solid fuel burning stove of claim 1 wherein the amount of catalyst is about 0.01% to about 6% by weight.

* * * * *